United States Patent [19]
Cox

[11] Patent Number: 5,253,828
[45] Date of Patent: Oct. 19, 1993

[54] CONCEALABLE FLAP-ACTUATED VORTEX GENERATOR

[75] Inventor: Ronald A. Cox, Norman, Okla.

[73] Assignee: The Board of Regents of The University of Oklahoma, Norman, Okla.

[21] Appl. No.: 916,316

[22] Filed: Jul. 17, 1992

[51] Int. Cl.⁵ .............................................. B64C 23/06
[52] U.S. Cl. ................................... 244/199; 244/212; 244/214
[58] Field of Search ............... 244/198, 199, 212, 214, 244/204

[56] References Cited

U.S. PATENT DOCUMENTS

| | | | |
|---|---|---|---|
| 3,263,945 | 8/1966 | Wimpenny | 244/199 |
| 4,032,087 | 6/1977 | Cleaves | 244/214 |
| 4,039,161 | 8/1977 | Bauer | 244/199 |
| 4,669,687 | 6/1987 | Rudolph | 244/213 |
| 4,702,441 | 10/1987 | Wang | 244/214 |
| 4,784,355 | 11/1988 | Brine | 244/213 |

Primary Examiner—Michael S. Huppert
Assistant Examiner—Anne E. Bidwell
Attorney, Agent, or Firm—Dunlap Codding Lee

[57] ABSTRACT

A concealable flap actuated vortex generator for generating a vortex on a lifting surface assembly, and an improved aircraft flight lifting surface having such concealable flap actuated vortex generators. When the flap of the lifting surface assembly is in the nominal (non-extended or non-deflected) position, the vortex generator is unexposed. When the flap is actuated by a flap actuator, the flap is extended or deflected from the nominal position, thereby projecting or exposing the vortex generator into an operational position and enabling the generation of a vortex.

10 Claims, 5 Drawing Sheets

CONCEALABLE FLAP-ACTUATED VORTEX GENERATOR

BACKGROUND OF THE INVENTION

1. Field of the Invention

The present invention relates generally to vortex generators which assist in the flow of fluids over lifting surfaces such as wings or wing flaps, and to lifting surfaces having such vortex generators, and more particularly, but not by way of limitation, to concealable vortex generators which are attached to flap actuators of lifting surfaces or which are revealed by the movement of flaps or slats attached to such lifting surfaces for assisting in the motion of fluids over lifting surfaces such as wings, elevators, rudders and ailerons of aircraft, rudders of ships and lifting surfaces of racing cars, and to lifting surfaces which have such concealable vortex generators.

2. Discussion of the Prior Art

Vortex generators (VG's) are vane-like structures which are attached to aircraft wings, or other lifting surfaces or fuselages. The applicant admits that vortex generators which are attached to surfaces wherein they are permanently exposed are old in the art. However, the applicant is not aware of any vortex generators attached to lifting surfaces which are alternately concealable and exposable.

Vortex generators ar often added to aircraft during the test-flight phase of an aircraft development to enhance a wing design or to fix an unforeseen problem with the flow of air over the wing surface. These problems may include loss of lifting effectiveness, increased buffet, a loss in lift-to-drag ratio, or a reduction in stability.

Many of these difficulties can be attributed to flow separation (separation of the flow from the wing or lifting surfaces) and it has been demonstrated that VG's can be an effective mechanism for delaying the onset of these difficulties. Vortex generators on aircraft are used to mix high-energy air outside of the boundary layer with the retarded air within the boundary layer. This allows the boundary layer to remain attached longer in regions of the flow with adverse pressure gradients.

Deflection of leading-edge and trailing-edge flaps has a large impact on the pressure gradients on aircraft. The present invention comprises a novel use of vortex generators to assist the flow in traversing through adverse pressure gradients generated by flap deflections. The present invention, when applied to aircraft, can enhance the performance of fighter, commercial or general aviation aircraft.

Vortex generators were first used in the late 1940s to increase wind-tunnel diffuser efficiencies. Following their initial use, a number of experimental studies indicated that if VG's were incorporated properly, they could be used to improve lifting effectiveness, extend the point of buffet onset, improve lift-to-drag ratio, or enhance stability. These benefits are achieved by delaying separation. The vorticity that is shed by the VG mixes the high-energy air external to the boundary layer with the retarded air within the layer.

VORTEX GENERATOR TYPES

There are three principle types of vane-type vortex generators: co-rotating, counter-rotating, and biplane. The VG's are generally placed in a single row. However, tandem configurations have been investigated as well. In tandem configurations, the second row of vortex generators can be used to re-energize the boundary layer if vortices from the first row have lost their effectiveness.

NOMENCLATURE

The nomenclature used to define the shape and placement of VG's is listed below.

| SYMBOL | DEFINITION |
| --- | --- |
| $AR_{VG}$ | aspect ratio = $2b_{VG}/c_{VG\text{-}avg}$ |
| $b_{VG}$ | height (span) of the vortex generator VG |
| $c_{VG}(y)$ | chord |
| $d$ | spanwise spacing of counter-rotating blades |
| $d/b_{VG}$ | nondimensionalized spacing of counter-rotating blades |
| $D$ | spanwise spacing of vanes or vane pairs |
| $D/d$ | relative spacing between vane pairs and counter-rotating blades. |
| $X_{VG}/C$ | chordwise placement |
| $y$ | spanwise direction |
| $\alpha_{VG}$ | angle of attack (relative to x-axis) |
| $\beta_{VG}$ | cross-flow angle |
| $\theta_{VG}$ | angle of attack (relative to local flow) = $\delta_{VG} + \beta_{VG}$ |
| $\delta$ | boundary layer thickness |

CO-ROTATING

Co-rotating VG's are placed at a uniform angle of attack, creating a row of vortices of the same sign. Co-rotating vortices maintain their strength far downstream if they are not too closely spaced. At close spacings, viscous dissipation reduces the strength of the shed vortex. The VG row is normally placed 10 to 20 boundary layer thicknesses upstream of the point of separation. Typically, the VG is placed at an angle to the local flow, $\theta$, of 20° and aspect ratios of one to two are common. Optimal spacings have been found to be in the range $4 < D/b_{vg} < 6$. The effective range of the vortices has been found to persist as far as 100 vortex heights, $b_{vg}$, downstream.

The induced flow field resulting from the vortices close proximity to the surface convects the vortices in a spanwise direction. For a VG generating lift in the positive y direction, the VG's propagate in the negative y direction. This can be used to achieve many of the benefits associated with a boundary layer fence on swept wings. The flow induced by the vortices slows any spanwise flow in the boundary layer. To achieve this effect, the VG's should be toed out for swept-back wings.

COUNTER-ROTATING

Counter-rotating vortex generators consist of a row of vanes of alternating angle. They have a greater local effectiveness than the co-rotating generators because of increased mixing. However, the flow field that is induced by the vortices convects the vortices toward each other and then away from the surface. Consequently, they have a limited range of effectiveness. For $\theta = \alpha_{VG}$, the row becomes co-rotating. As the lift coefficient on the vanes increases, the chordwise extent of the vortices effectiveness decreases. As $D/b_{VG}$ increases, the effective range increases. This behavior lends the counter-rotating scheme to flow conditions that are relatively constant (e.g., commercial applications). Typically, $D/d$ has a value of about four and $D/b_{VG}$ will vary between five and ten.

BIPLANE

The biplane configuration of vortex generators consists of alternating sets of counter-rotating generators.

DESIGN VARIABLES

The principle design variables that influence the performance of vortex generators are:
1. The chordwise spacing between the VG and the flow phenomena that they are being used to enhance, ($\Delta x_{vg}/c$).
2. The relative spacing between VG's or VG pairs, $D/b_{VG}$.
3. The relative spacing between counter-rotating VG's, $D/d$.
4. The relative depth of the VG, $b_{VG}/\delta$.
5. The strength of the vortex shed. This is controlled primarily by the local flow direction, $\theta_{VG}$ and the VG area, but it is dependent on the aspect ratio as well.

The VG must be about as large as the boundary layer thickness. Typical values for $b_{VG}/\delta$ vary between 1 and 1.2. Since the boundary layer thickness varies throughout the flight spectrum, a fixed VG height may prove ineffective if the VG tip extends too far out of the boundary layer or if it is imbedded too deeply in the layer. One of the benefits of the present invention is that it is possible to vary the span of the VG as the geometry is changed.

BRIEF SUMMARY OF THE INVENTION

The present invention consists of at least one concealable vortex generator, and more generally a plurality of concealable vortex generators, attached to a lifting surface assembly. In a preferred embodiment, this lifting surface assembly could be an aircraft wing comprising a wing box and a leading-edge and/or trailing-edge flap or a slat or a slotted flap, wherein the vortex generator is attached to the flap or to the wing box. The flap of the wing could also be an aileron of a wing. However, in other embodiments, the lifting surface assembly could be comprised of a vertical tail box and a rudder of an aircraft or comprised of a horizontal tail box and an elevator of an aircraft. Horizontal tail box is here meant to encompass both a rear horizontal tail of an aircraft and a canard of an aircraft. The lifting surface assembly could be comprised of a rudder box and a rudder of a ship. Additionally, another embodiment could be the lifting surface of a race car, the lifting surface having a lifting surface box and a lifting surface flap. Another embodiment could be the lifting surface assembly of a planetary probe designed to move through a planetary atmosphere. In all of these embodiments, concealable vanes serving as vortex generators are attached either to the flap or to the box of the lifting surface assembly.

Discussed below is the application of the present invention, a flap-actuated vortex generator (FAVG), to lifting surface assemblies comprising a wing and flap. The use in other configurations would be similar.

For nominal flap deflections (i.e., when the flap has zero deflection), the vortex generator is concealed in the gap between the flap and the wing box. As the flap is deflected, a larger and larger fraction of the VG is exposed. The external air energizes the boundary layer and allows the flow to remain attached to the surface for a longer extent than would otherwise be possible.

Various benefits are associated with the use of the FAVG concept on aircraft. Several are delineated below.
(1) The FAVG allows the flow to remain attached through greater adverse pressure gradients. This will result in higher lift-to-drag ratios.
(2) The FAVG shape can be tailored to the aerodynamics of different aircraft.
(3) For VGs located in a locally supersonic flow, VG-generated shocks may cause premature boundary-layer separation. Since the FAVG is imbedded in the wing for the nominal deflection position of the flap, no drag penalty should arise. This will allow use on aircraft that operate at supersonic speeds.
(4) Adverse pressure gradients increase in magnitude with increasing trailing-edge flap deflection. This will result in a thicker boundary layer. For FAVGs this does not present a problem, as it does with fixed VG's, since the FAVG height can be designed to be a function of the flap deflection angle.
(5) The FAVG can be added to current aircraft if space is available in the flap/wing-box gap.
(6) The FAVG concept can be used in conjunction with aileron, elevator, or rudder deflections.

The FAVG could easily be incorporated on aircraft that are currently in the design phase. The ATF would be the most likely candidate in this regard. It may be possible to retrofit the FAVG to existing aircraft that use plain flaps. Among the U.S. military aircraft which have plain flaps and would be potential candidates for the incorporation of the FAVG are: General Dynamics F-16, Grumman F-14, Grumman X-29, Lockheed F-117, Lockheed/Boeing/General Dynamics ATF, and McDonnell Douglas F-15 and F-18.

BRIEF DESCRIPTION OF THE DRAWINGS

FIG. 6 is a side sectional view showing an alternative embodiment in which the flap actuator cover is attached to the wing box of a lifting surface assembly having a leading-edge flap.

FIG. 8A is a perspective view of a wing having a slat in a deflected position whereby the vortex generators are exposed.

FIG. 8B is a side sectional view of FIG. 8A.

BRIEF DESCRIPTION OF THE PREFERRED EMBODIMENTS

Figure 1:
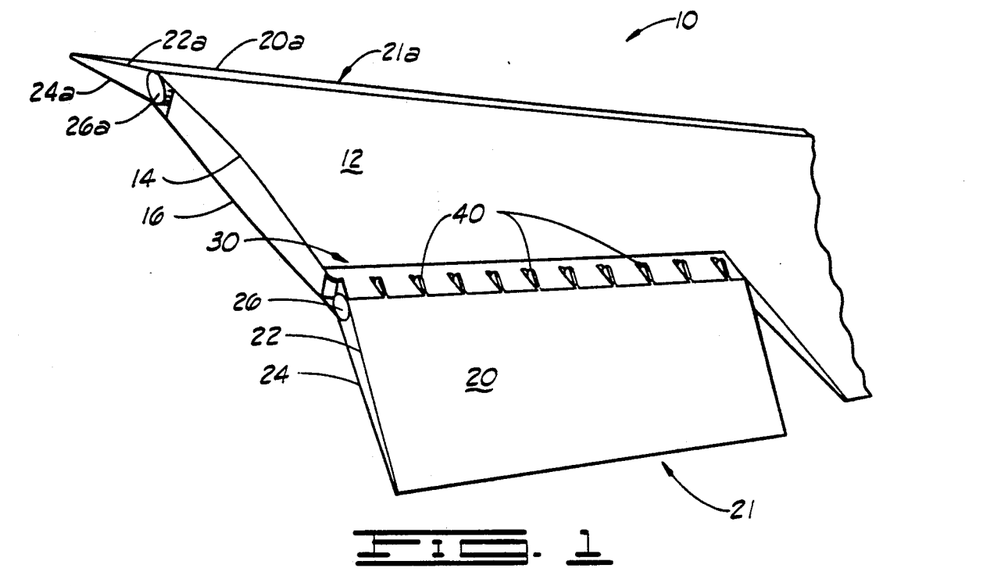
FIG. 1 is a perspective view of a lifting surface assembly having a leading-edge lifting surface flap and a trailing-edge lifting surface flap. Both flaps are in the deflected position.

FIG. 1 shows a lifting surface assembly 10 which is comprised of a lifting surface box 12 having a first surface 14 and a second surface 16. The first surface 14 may be an upper surface and the second surface 16 may be a lower surface if the lifting surface assembly 10 is horizontally oriented such as when the assembly 10 is an aircraft wing (wherein the fuselage of the aircraft is not shown), an aircraft elevator (wherein the rest of the aircraft fuselage and tail is not shown), or the lifting surface of a racing car (wherein the racing car itself is not shown). If the lifting surface assembly 10 is oriented in a vertical manner, however, the first surface 14 and second surface 16 of the lifting surface box 12 could be a first lateral surface 14 and a second lateral surface 16, for example if the lifting surface assembly 10 is an aircraft vertical tail (wherein the remainder of the aircraft tail and fuselage is not shown) or a ship rudder (wherein the remainder of the ship is not shown).

The lifting surface assembly 10 is further composed of at least one lifting surface flap which is herein defined as a portion of a lifting surface assembly which is movable in an upward, downward, sideward, forward or backward direction. This definition includes therefore slats and slotted flaps as well as plain flaps. The flap may be a trailing-edge flap 20 which is located on the posterior edge 21 of the lifting surface assembly 10 or a leading-edge flap 20a which is located on the anterior edge 21a of the lifting surface assembly 10. In the context of the present invention the anterior edge 21a of the lifting surface assembly 10 is the first edge of the lifting surface assembly 10 to encounter the flow medium (not shown) which is air in the case of aircraft, or racing cars, water in the case of a ship rudder, and a planetary atmosphere in the case of a planetary probe.

The flaps 20 and 20a are known respectively, as a trailing-edge flap 20 and a leading-edge flap 20a when the lifting surface assembly 10 is an aircraft wing or racing car lifting surface. The lifting surface flap 20 is known as a wing aileron when the flap 20 is located near the distal end of an aircraft wing. The lifting surface flap 20 is referred to as an elevator 20 when the lifting surface assembly 10 is a horizontal tail of an aircraft (not shown). The lifting surface flap 20 is referred to as a rudder when the lifting surface assembly 10 is the rudder of an aircraft (not shown) or the rudder of a ship (not shown).

The lifting surface flap 20 has a flap actuator assembly 26 which hingeably connects the lifting surface flap 20 to the lifting surface box 12. The lifting surface flap 20a has a flap actuator assembly 26a which hingeably connects the lifting surface flap 20a to the lifting surface box 12. Flap lifting means (not shown) connected to the flap actuator assembly 26 or 26a actuate the lifting surface flap 20 or 20a in an up or down direction (if the lifting surface assembly 10 is horizontally oriented) or in a side to side direction (if the lifting surface assembly 10 is vertically oriented).

Figure 2:
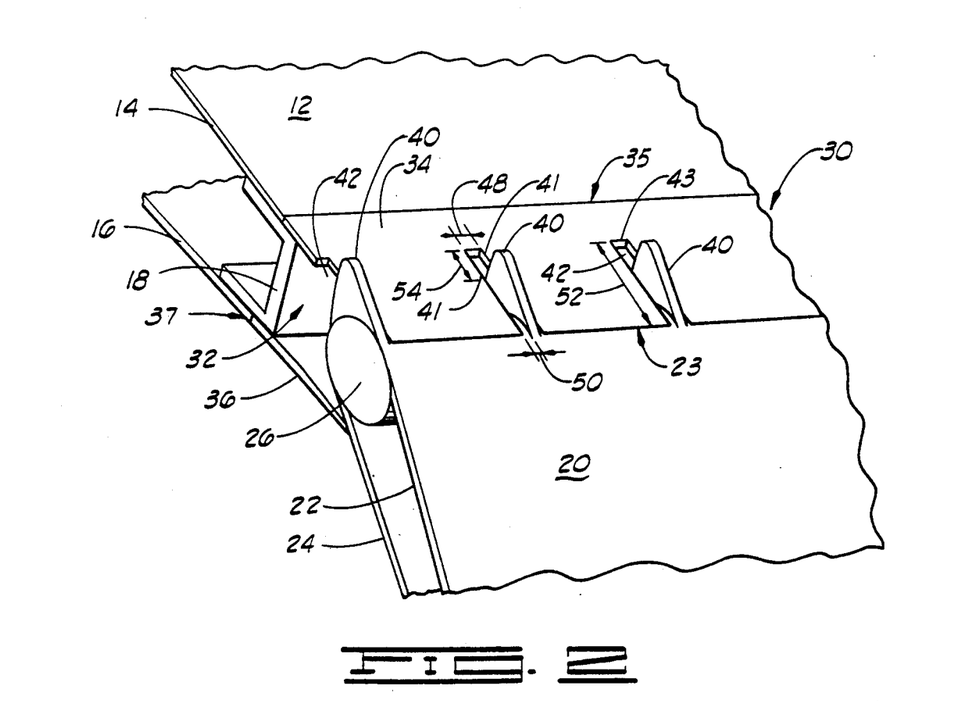
FIG. 2 is an enlarged perspective view of a portion of the trailing-edge lifting surface flap of FIG. 1.

FIG. 2 indicates a flap-gap 32 which exists between the lifting surface box 12 and the lifting surface flap 20. The flap-gap 32 is generally enclosed by a flap-gap cover assembly 30 which is composed further of a first flap-gap cover 34 and a second flap-gap cover 36. The first flap-gap cover 34 is connected by connecting means (not shown) to some portion of the lifting surface assembly 10, such as the support spar component 18 of the lifting surface box 12, as indicated in FIG. 2. The first flap-gap cover 34 extends from the posterior edge 35 of the first surface 14 of the lifting surface box 12 to at least near the anterior edge 23 of the first surface 22 of the lifting surface flap 20, as indicated in FIG. 2.

The second flap-gap cover 36 is connected by connecting means (not shown) to some portion of the lifting surface assembly 10, such as, the support spar component 18 of the lifting surface box 12, as indicated in FIG. 2.

The second flap-gap cover 36 extends from the posterior edge 37 of the second surface 16 of the lifting surface box 12 to at least near the anterior edge (not shown) of the second surface 24 of the lifting surface flap 20, as indicated in FIG. 2.

As further indicated in FIGS. 2–4B, the flap actuator assembly 26 is disposed astride the ga 32 and is at least partially covered and enclosed by the first flap-gap cover 34 and the second flap-gap cover 36. The lifting surface assembly 10 is further comprised of at least one, and more typically a plurality of, vanes 40 which are attached to the flap actuator assembly 26.

The vanes 40 are extended from the longitudinal axis of the flap actuator 26 as indicated in FIG. 2. A vane 40 thus formed is also referred to as a flap actuated vortex generator. The position of a lifting surface flap 20 can be changed in response to the actuation of the flap actuator assembly 26. The lifting surface flap 20 is in a zero deflection or nominal position when it is positioned as indicated in FIGS. 3A, and 4A, 5A, 6 and 7A. In this nominal position, the first surface 14, the first flap-gap cover 34 and the first surface 22 of the lifting surface flap 20 form a substantially continuous surface having no significant angle.

Figure 3A:
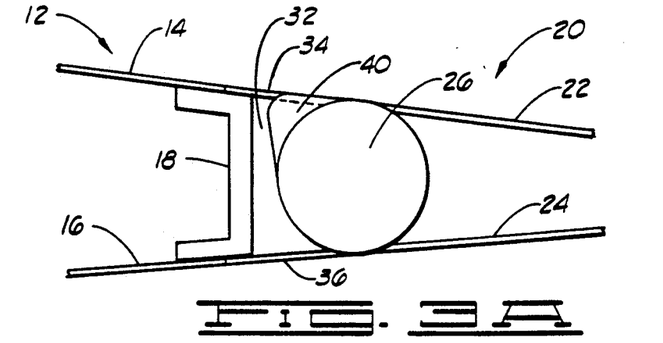
FIG. 3A is a side sectional view of a portion of a lifting surface flap, having a single vortex generator, in the nominal position.
Figure 3B:
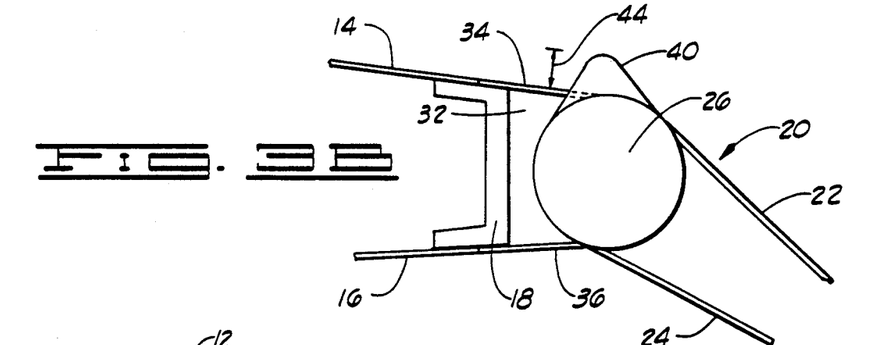
FIG. 3B is a side sectional view of a portion of a lifting surface flap, having a single vortex generator, in a deflected position.
Figure 4A:
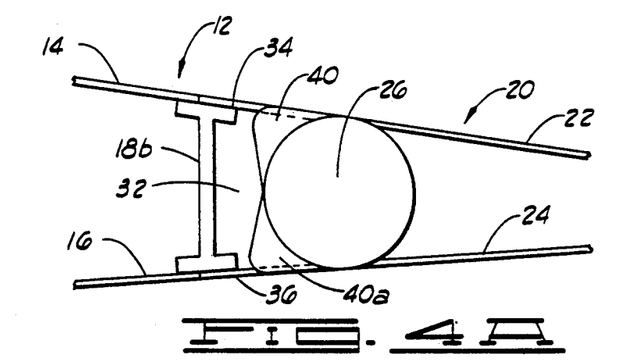
FIG. 4A is a side sectional view of a portion of a lifting surface flap, having a dual vortex generator, in the nominal position.
Figure 4B:
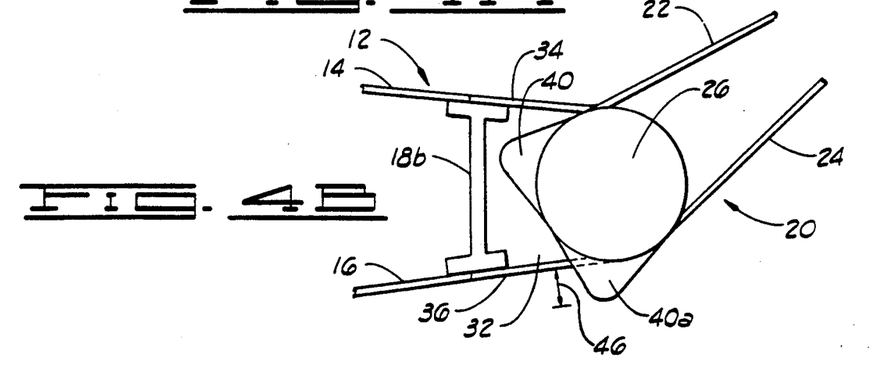
FIG. 4B is a side sectional view of a portion of a lifting surface flap, having a dual vortex generator, in a deflected position.
Figure 4C:
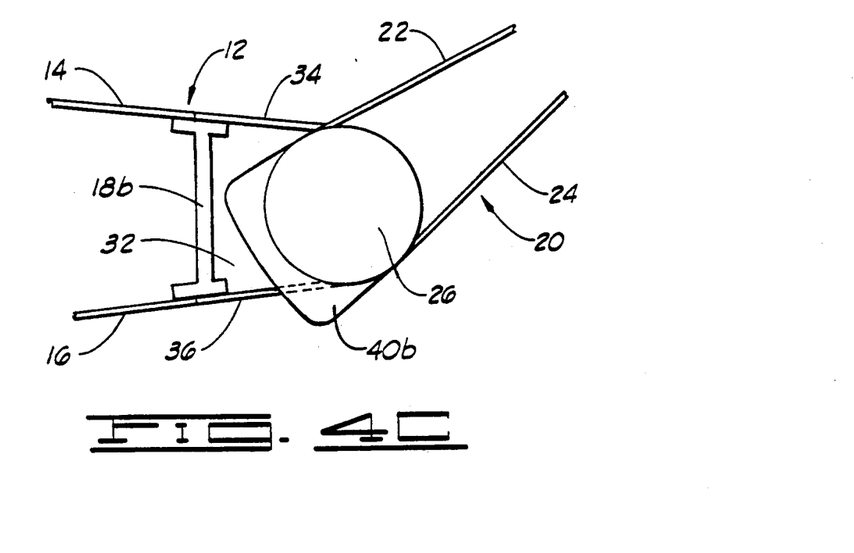
FIG. 4C is a side sectional view of a portion of an alternative embodiment of a lifting surface flap in a deflected position showing a different vortex generator shape.
Figure 5:
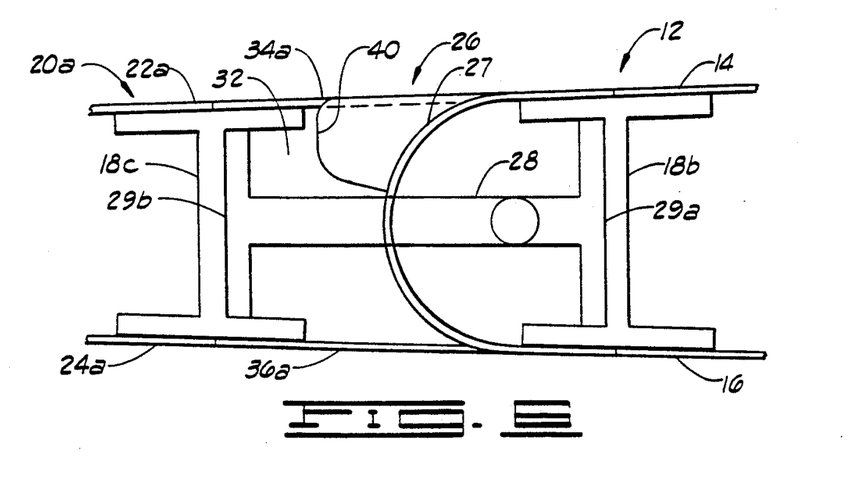
FIG. 5A is a side sectional view showing an actuator hinge assembly and flap actuator cover of a flap actuator assembly of a lifting surface assembly in a nominal position.
FIG. 5B is the lifting surface assembly of FIG. 5A in a deflected position.
Figure 5A:
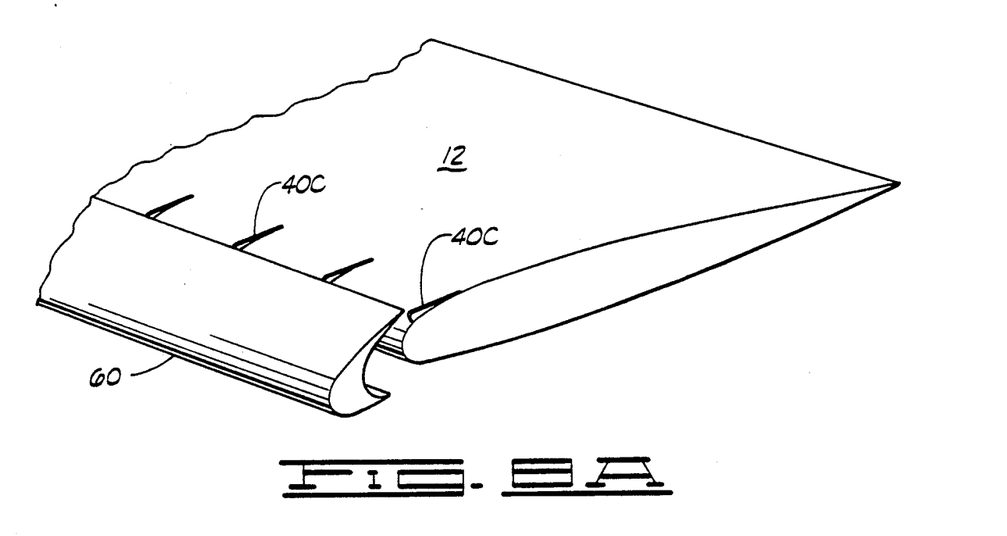
Figure 5B:
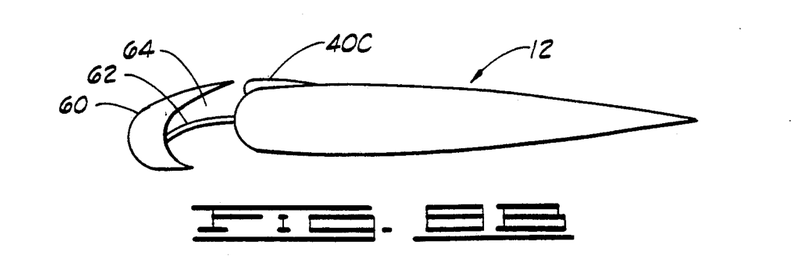
Figure 7A:
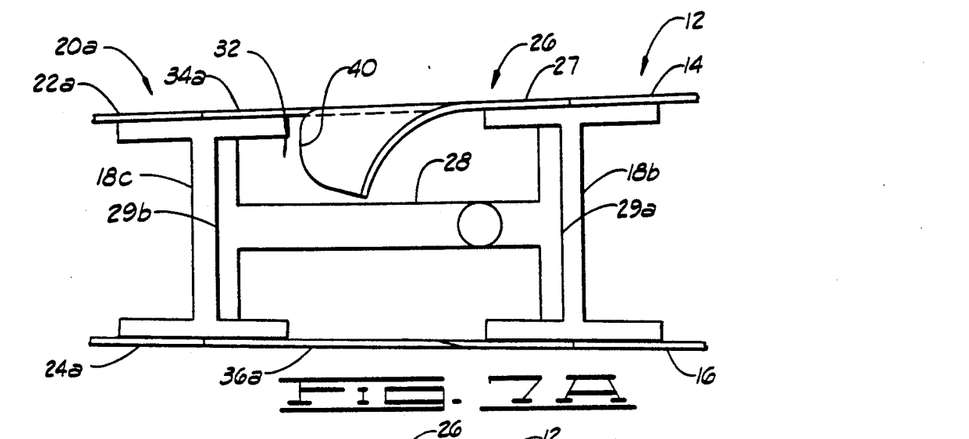
FIG. 7A is a side sectional view showing another alternative embodiment having a partial flap actuator cover attached to a wing box having a leading-edge flap in the nominal position.
Figures 7B, 9A, 9B:
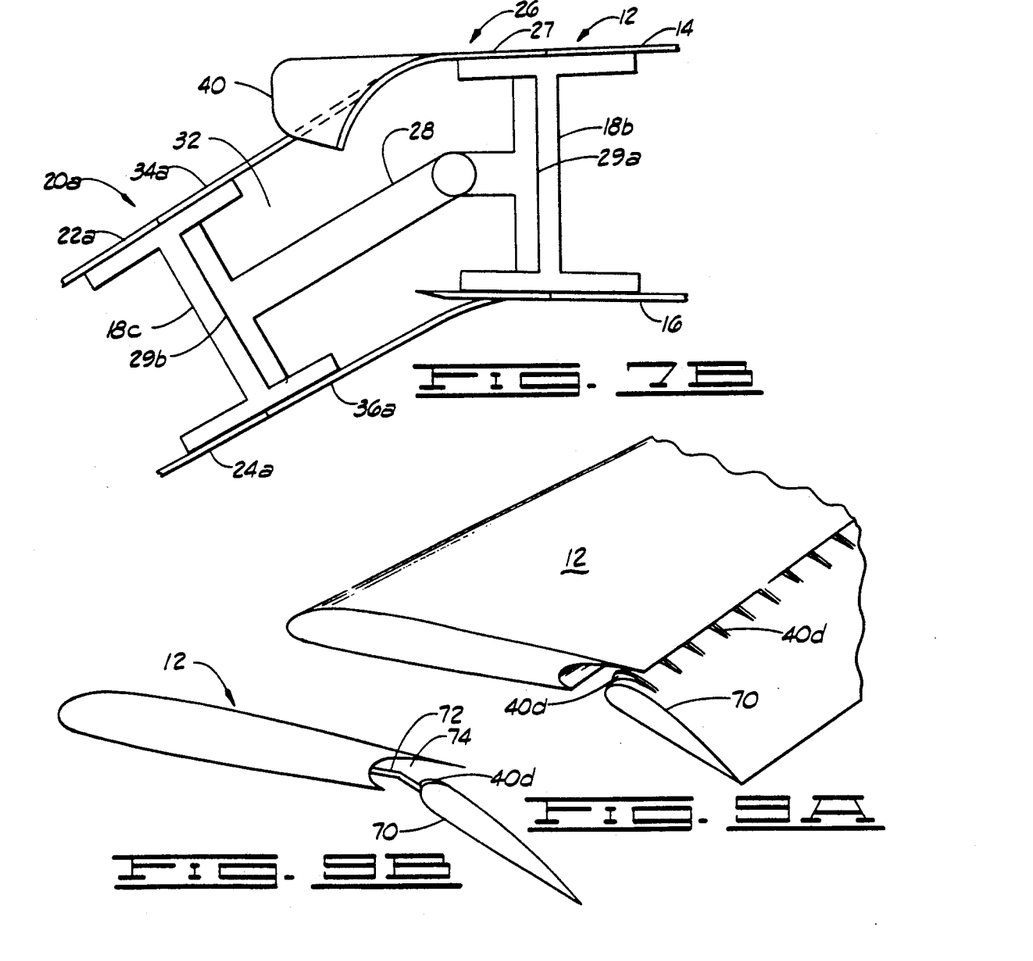
FIG. 7B is the embodiment of FIG. 7A shown in a deflected position.
FIG. 9A is a perspective view of a wing having a slotted flap.
FIG. 9B is a side sectional view of FIG. 9A.

When the flap actuator assembly 26 is actuated, the lifting surface flap 20 is caused to be deflected from the nominal position into a deflected position, as indicated in FIGS. 3B, 5B and 7B wherein the direction is downward, and FIG. 4B and 4C wherein the direction is upward, thereby resulting in an angle between the lifting surface box 12 and the lifting surface flap 20. In another embodiment wherein the lifting surface assembly 10 is oriented vertically (such as with an aircraft vertical tail or a ship rudder), the deflection from the nominal position would be lateral.

When the lifting surface flap 20 is in the nominal position, the vane (i.e., the flap actuated vortex generator) 40 is contained at least substantially, and in some embodiments, wholly, within the gap 32, and beneath or flush with the first flap-gap cover 34 (see FIG. 3A).

When the lifting surface flap 20 is deflected from the nominal position (FIG. 3A) to a deflected position (FIG. 3B), the vane 40 is at least partially extended through a slot 42 (FIG. 2) in the first flap-gap cover 34 of the flap-gap cover assembly 30. The vane 40 is extended a distance 44 beyond the first flap-gap cover 34.

The terms "first" and "second" are used here only to distinguish different surfaces of the various components of the lifting surface assembly 10 and should not be interpreted as restricting the components to any particular direction or orientation. For example, the term "first flap-gap cover" should not be interpreted as being limited to a surface with an "upper" orientation or "right-hand" orientation. Similarly, the term "second flap-gap cover" should not be interpreted as being limited to a surface with a "lower" or "left-hand" orientation.

In a dual vane, or dual vortex generator, embodiment of the invention, (FIGS. 4A-4B) the vanes 40 and 40a may be attached to the flap actuator assembly 26 at two separate orientations simultaneously. In this embodiment, at least one or a plurality of vanes 40 are in a position near the first flap-gap cover 34 and at least one or a plurality of vanes 40a are in a position near the second flap-gap cover 36. When the lifting surface flap 20 is in the nominal position, both vanes 40 and 40a are contained at least substantially, and in some embodiments, wholly, within the gap 32 as indicated in FIG. 4A.

In this particular embodiment, which may be particularly adaptable to ailerons, rudders and elevators, when the lifting surface flap 20 is in a deflected position, either vane 40 or vane 40a is extended beyond a slot 42 in the flap-gap cover 34 or 36, respectively. When the vane 40 is extended beyond the flap-gap cover 34 (not shown), the vane 40a is retained within the gap 32. When the vane 40a is extended beyond the flap-gap cover 36, the vane 40 is retained within the gap 32 (FIG. 4A). FIGS. 4A-7B show a spar 18b constructed differently from spar 18 of FIGS. 3A-3B. It will be understood by one of ordinary skill in the art of construction of lifting surface assemblies, in particular of aircraft wings, that there are a number of acceptable spar designs. The primary spar design consideration regarding the present invention is that the spar 18 or 18b provide sufficient space within the gap 32 for storage and movement of the vanes 40 and 40a.

A modification of the dual vane embodiment is shown in FIG. 4C. In this embodiment a single vane 40b functions in a similar manner as the dual vanes 40 and 40a of FIGS. 4A and 4B in that at least a portion of the vane 40b is exposed through a slot 42 regardless of the particular deflection position of the lifting surface flap 20.

The vanes 40, 40a or 40b attached to the flap actuator assembly 26 can be more specifically defined and referred to as flap actuated vortex generators (FAVGs). A FAVG 40 is a thin piece of material which may be a metal, composite or other stiff material which is concealable in a nominal position and exposable in a deflected flap position.

The slot 42 in the flap-gap cover 34 or 36 must have a sufficient width 48 to allow the projection of the FAVG 40 through the slot 42 (FIG. 2), but the width 48 must not be so great as to create an excessively large gap 50 between the FAVG 40 and the edge 41 of the slot 40. Similarly, the length 52 of the slot 40 should be sufficient to allow extension of the FAVG 40 through the slot 42 but not so long as to create an excessively large gap 54 between the FAVG 40 when extended and the end 43 of the slot 40. The FAVGs 40 and 40a can be extended variable distances 44 (FIG. 3B) and 46 (FIG. 4B) beyond the flap-gap covers 34 and 36, respectively, depending on the degree of deflection from the nominal position. A lesser deflection will result in distances 44 and 46 of lesser magnitude while a greater deflection will result in distances 44 and 46 of greater magnitude up to a maximum distance (not shown).

The preferred embodiment of the present invention is shown in more detail in FIGS. 5A-5B which describe a wing box 12 and a trailing-edge flap 20. The flap actuator assembly 26 comprises a flap actuator cover 27 and an actuator hinge assembly 28. A flap support spar 18c is shown within the trailing-edge flap 20. The first surface 22 and second surface 24 of the flap 20 and the flap actuator cover 27 are connected to the support spar 18c. The hinge assembly 28 of the flap actuator assembly 26 is attached at end 29a to the spar 18b of the wing box 12 and at end 29b to the spar 18c of the wing flap 20. When the wing flap 20 is deflected downward from the nominal position, the flap actuator cover 27 is moved, thereby causing the vane 40 to be exposed above the wing box surface 14 and the flap-gap cover 34.

FIG. 6 shows a leading-edge flap 20a which is another version of the preferred embodiment in which the flap actuator cover 27 of the flap actuator assembly 26 is attached to the spar 18b of the wing box 12 rather than to the spar 18c of the wing flap 20a. The hinge assembly 28 is attached at one end 29a to the spar 18b of the wing box 12 and at the other end 29b to the spar 18c of wing flap 20a.

In the embodiment of FIG. 6, when the wing flap 20a is deflected from the nominal position, the vane 40 remains stationary, but is still exposed by virtue of the fact that the flap-gap cover 34, attached to spar 18c of the wing flap 20a is dropped below the vane 40.

Similarly, in the embodiment of FIGS. 7A and 7B, the flap actuator cover 27 bearing the vane 40 is attached to the spar 18b flap 20a. The first flap-gap cover 34a and the second flap-gap cover 36a are attached to spar 18c of the wing flap 20a. When the leading-edge wing flap 20a is deflected from the nominal position, the first flap-gap cover 34a drops below the vane 40, thereby exposing the vane 40 from its concealed position within the flap-gap 32. In this, the manner of the embodiments of both FIGS. 6 and 7A-7B, the actuation of the flap causes exposure of the vortex generator, vane 40, even though the vane 40 is attached to the wing box 12 (by way of the flap actuator cover 27) and not to the wing flap 20 or 20a. In a similar manner, it can be envisioned that ailerons, rudders and elevators, could be so constructed.

An additional embodiment of the invention is shown in FIGS. 8A and 8B. FIG. 8A shows a lifting surface box 12 such as a wing box having a slatted configuration. The slat 60, which is a type of lifting surface flap, as herein defined, is attached by a flap actuator assembly, more specifically defined as a slat extension means 62, as shown in FIG. 8B. In the nominal position (not shown) the slat 60 is engaged with the anterior edge of the wing box 12.

In a deflected position (FIGS. 8A-8B), the slat 60 is extended away from the wing box 12 by the slat extension means 62 wherein a slat gap 64 is formed. In the nominal position, vanes 40c which are attached to the anterior edge of wing box 12 are concealed within slots (not shown) within the slat 60, wherein the vanes 40c are not exposed when the slat 60 is in the nominal position. When the slat 60 is actuated into a deflected position (FIGS. 8A-8B), the vanes 40c are exposed on the anterior surface of the wing box 12 and are thereby able to function as vortex generators.

A final embodiment of the invention is shown in FIGS. 9A and 9B. FIG. 9A shows a lifting surface box 12 such as a wing box having a slotted flap 70. The slotted flap 70, which is a type of lifting surface flap, as herein defined, is attached by a flap actuator assembly, more specifically defined as a slotted flap extension means 72, as shown in FIG. 9B. In the nominal position (not shown) the slotted flap 70 is engaged with the posterior edge of the wing box 12. In a deflected position (FIGS. 9A and 9B), the slotted flap 70 is extended away from the wing box 12 by the slotted flap extension means 72 wherein a slotted flap 74 (FIG. 9B) is formed. In the nominal position, vanes 40d which are attached to the anterior edge of slotted flap 70 are concealed within slots (not shown) within the wing box 12, wherein the vanes 40d are not exposed when the slotted flap 70 is in the nominal position. When the slotted flap 70 is actuated into a deflected position (FIGS. 9A and 9B), the vanes 40d are exposed on the anterior surface of the slotted flap 70 and are thereby able to function as vortex generators.

The present invention further defines a method of generating a variable vortex (not shown) on a lifting surface assembly 10 of an object (not shown). In the initial step of the process, an object (not shown) is provided which has at least one lifting surface assembly 10. The object may be an aircraft, a ship or a racing car. The lifting surface assembly 10 of the object may be a wing, a vertical tail or a horizontal tail, a ship rudder or a racing car lifting surface. The lifting surface assembly 10 has a lifting surface box 12 and at least one lifting surface flap 20 as defined previously. Also as defined previously, the lifting surface flap 20 has a flap actuator 26 to which is attached at least one, but in a preferred embodiment, a plurality of, flap actuated vortex generators 40.

The next step in the process is to cause the lifting surface assembly 10 to move through a fluid or to cause a fluid to move over the lifting surface assembly 10 of the object. In the embodiment in which the lifting surface assembly 10 is an aircraft wing or tail or a racing car lifting surface, the medium is air. In the case in which the lifting surface assembly 10 is a ship rudder, the medium is water.

After the object has been made to move through the fluid or the fluid has been caused to move over the object, the next step in the process is to deflect the lifting surface flap 20 from the nominal position to a deflected position whereby one or more of the flap actuated vortex generators 40 are extended or exposed a distance 44 beyond at least the first surface 14 of the lifting surface box 12 of the object thereby causing a vortex to be generated within the fluid (not shown) which is flowing over the lifting surface assembly 10. The vortex can be varied by varying the magnitude of the deflected position of the lifting surface flap 20.

Changes may be made in the embodiments of the invention described herein or in parts of the elements of the embodiments described herein or in the steps or in the sequence of steps of the methods described herein without departing from the spirit and scope of the invention as defined in the following claims.

What is claimed is:

1. An improved flight lifting surface assembly for aircraft, the flight lifting surface assembly having a flight lifting surface box, a flight lifting surface flap, and a flap actuator assembly for hingeably connecting the flight lifting surface flap to the flight lifting surface box wherein the improvement comprises:

a plurality of vanes of substantially rectangular cross-section mounted directly to the flap actuator assembly wherein the vanes are substantially concealed when the flight lifting surface flap is in a nominal position relative to the flight lifting box and wherein the vanes are exposed a variable distance into a boundary layer and able to generate vortices in the boundary layer on a portion of the lifting surface assembly during flight when the flight lifting surface flap is in a deflected position relative to the flight lifting box.

2. The improved flight lifting surface assembly of claim 1 wherein the flight lifting surface box is further defined as belonging to the group of flight lifting surface boxes which includes an aircraft wing box, an aircraft horizontal tail, and an aircraft vertical tail.

3. The improved flight lifting surface assembly of claim 1 wherein the flight lifting surface flap is further defined as belonging to the group of flight lifting surface flaps which includes a leading-edge wing flap, a trailing-edge wing flap, a wing slat, a slotted flap, an aileron, an elevator, and a rudder.

4. An improved flight lifting surface assembly, the flight lifting surface assembly having a flight lifting surface box, a flight lifting surface flap, a flap actuator assembly for hingeably connecting the flight lifting surface flap to the flight lifting surface box, wherein the flap actuator assembly is positioned generally within a gap between the flight lifting surface box and the flight lifting surface flap, a flap-gap cover assembly for covering the gap wherein the flap-gap cover assembly has at least one slot and extends across the gap between the lifting surface box and the lifting surface flap, the improvement comprising:

at least one vane of substantially rectangular cross-section mounted directly to the flap actuator assembly and extending therefrom, the vane having a shape and position on the flap actuator assembly such that when the flight lifting surface flap is in a nominal position relative to the flight lifting surface box the vane is substantially concealed within the gap and such that when the flight lifting surface flap is deflected from the nominal position, the vane is projected a variable distance through the slot of the flap-gap cover assembly thereby extending the vane into a boundary layer and rendering it in a position to generate a vortex in the boundary layer on a portion of the flight lifting surface assembly.

5. A lifting surface assembly, comprising:
a lifting surface box;
a lifting surface flap;
a flap actuator assembly for hingeably connecting the lifting surface flap to the lifting surface box;
a flap-gap cover assembly for covering a gap existing generally between the lifting surface box and the lifting surface flap wherein the flap-gap cover assembly further comprises:
a first flap-gap cover having a slot and connected to a first portion of the lifting surface assembly and extending a first distance therefrom over the gap, and
a second flap-gap cover connected to a portion of the lifting surface assembly and extending a second distance therefrom over the gap to near the second surface of the lifting surface flap whereby the flap actuator assembly is rendered substantially covered by the first flap-gap cover and the second flap-gap cover; and at least one vane of substantially rectangular cross-section mounted directly to the flap actuator assembly and extending therefrom, the vane having a shape such that when the lifting surface flap is in a nominal position in relation to the lifting surface box the vane is substantially concealed by the first flap-gap cover and the second flap-gap cover and such that when the lifting surface flap is deflected from the nominal position to a deflected position, the vane is at least partially and variably extended through the slot in the first flap-gap cover thereby at least partially and variably exposing the vane beyond the first flap-gap cover and extending the vane a distance beyond the surface of the lifting surface assembly into a boundary layer thereon.

6. The lifting surface assembly of claim 5 wherein the lifting surface box is further defined as belonging to the group of aircraft flight lifting surface boxes which includes a wing box, a vertical tail, and a horizontal tail.

7. The lifting surface assembly of claim 6 wherein the lifting surface flap is further defined as belonging to the group of aircraft flight lifting surface flaps which includes a leading-edge wing flap, a trailing-edge wing flap, an aileron, an elevator and a rudder.

8. The lifting surface assembly of claim 5 wherein the lifting surface box is a ship rudder box and the lifting surface flap is a ship rudder.

9. The lifting surface assembly of claim 5 wherein the lifting surface box is a racing car lifting surface box and the lifting surface flap is a racing car lifting surface flap.

10. A flap actuated vortex generator for generating a vortex in a boundary layer on a portion of the surface of a lifting surface assembly, the lifting surface assembly having a lifting surface box, a lifting surface flap, a flap actuator assembly for hingeably connecting the lifting surface flap to the lifting surface box, and a flap-gap cover assembly for covering a gap existing generally between the lifting surface box and the lifting surface flap and containing the flap actuator assembly generally therein, the flap actuator assembly for actuating the lifting surface flap from a nominal position relative to the lifting surface box, to a deflected position and back to a nominal position, the flap actuated vortex generator comprising:

a vane of substantially rectangular cross-section adapted for mounting directly to a flap actuator assembly of a lifting surface assembly such that when the lifting surface flap is returned by the flap actuator assembly to the nominal position the vane is substantially concealed and unexposed within the gap and when the flap actuator assembly actuates the lifting surface flap from the nominal position into a deflected position, the vane is positioned a variable distance beyond the flap-gap cover assembly whereby the vane is unconcealed and exposed for the purpose of generating a vortex in a boundary layer on a portion of the lifting surface assembly.

* * * * *